United States Patent [19]

Ely

[11] Patent Number: 4,979,120
[45] Date of Patent: Dec. 18, 1990

[54] CONTROL SYSTEM FOR AUTOMATIC ADJUSTMENT OF LATHE KNIFE PITCH

[75] Inventor: Gary W. Ely, Canby, Oreg.

[73] Assignee: The Coe Manufacturing Company, Painesville, Ohio

[21] Appl. No.: 276,969

[22] Filed: Nov. 28, 1988

[51] Int. Cl.⁵ .......................... G06F 15/46; B27L 5/02
[52] U.S. Cl. ............................... 364/474.09; 144/213; 144/357; 364/474.02
[58] Field of Search ...................... 364/474.09, 474.02, 364/167.01; 144/209 R, 211, 212, 213, 356, 357, 365

[56] References Cited

U.S. PATENT DOCUMENTS

| | | | |
|---|---|---|---|
| 4,380,259 | 4/1983 | Brookhyser et al. | 364/478 X |
| 4,392,519 | 7/1983 | Calvert | 364/174 X |
| 4,494,588 | 1/1985 | Berry et al. | 364/474.09 |
| 4,506,714 | 3/1985 | Shrum et al. | 364/474.09 X |
| 4,708,180 | 11/1987 | Browning, Jr. et al. | 144/213 |
| 4,791,970 | 12/1988 | Walser et al. | 364/474.02 X |

*Primary Examiner*—Joseph Ruggiero
*Attorney, Agent, or Firm*—Klarquist, Sparkman, Campbell, Leigh & Whinston

[57] ABSTRACT

An electrical control system is described for automatic adjustment of the pitch angle of a lathe knife in a veneer lathe apparatus in response to reduction of the diameter of the log during peeling. The control system includes a digital computer having a memory in which are stored a plurality of data tables of different pitch angle profile ranges for different wood species. The lathe knife pitch angle is adjusted by such compute control system changing the height of a cam follower roller on a knife carriage which moves along a mechanical pitch rail cam member during peeling.

20 Claims, 4 Drawing Sheets

CONTROL SYSTEM FOR AUTOMATIC ADJUSTMENT OF LATHE KNIFE PITCH

BACKGROUND OF INVENTION

The subject matter of the present invention relates generally to veneer lathe apparatus for peeling sheets of veneer from a rotating log by means of a lathe knife of adjustable pitch and, in particular, to an electrical control system for automatic adjustment of lathe knife pitch angle in response to reduction of the diameter of the log during peeling.

As shown in U.S. Pat. No. 4,708,180 of R. A. Browning, et al., issued Nov. 24, 1987, it has heretofore been the practice to provide a veneer lathe with automatic adjustment of the lathe knife pitch angle by a mechanical control including a cam follower roller on the knife carriage which rolls along a pitch rail cam member. The slope of the pitch rail is set manually or by other mechanical adjustment means prior to the start of peeling and the knife pitch is then adjusted entirely by movement of the cam follower roller along the surface of the pitch rail during peeling. In most cases, the pitch rail is linear with a constant slope. However, such roll may be provided with a custom profiled end portion of changing slope for small diameter logs as discussed in the Browning patent. Unfortunately, such a custom-made pitch rail having an end portion of different slope does not apply to all species or types of wood. In addition, manual adjustment of the pitch rail to set the slope angle at the start of the peel is time consuming and inaccurate. The above-cited Browning patent also discloses the use of an automatic control means employing a computer for adjusting the gap between the lathe knife and a nose bar roll engaging the log immediately in front of the knife in response to changes in the log diameter and knife pitch during peeling. However, there is nothing in this patent which teaches that the pitch angle of the knife should be adjusted automatically by an electrical control system including a computer in accordance with knife pitch profile tables stored in the memory of such computer in the manner of the present invention.

During the veneer peeling process, better quality veneer is usually produced when the lathe knife pitch angle is varied as the radius of the log diminishes during peeling. Typically, the knife pitch angle, which is the angle the front cutting edge of the knife makes with a vertical plane passing through the tip of such knife, varies from a positive angle or "lead" where the knife is tipped away from the log for logs of large diameter to a negative pitch angle or "heel" where the knife blade is inclined toward the log for small diameter log blocks. The difficulty is that the manner in which the knife pitch angle should be varied during peeling is different for different species or types of wood. This requires frequent manual adjustment of the slope of the pitch rail and replacement of any custom profile pitch rail with another profile when such rail is provided with an end portion of changing slope. These problems are overcome in the present invention by electrical control of the lathe knife pitch angle using a digital computer having digital data representing different profiles of pitch angle adjustment provided as a plurality of different knife pitch tables stored in the memory of the computer.

In the electrical control system of the present invention, the computer is employed to control the knife pitch by adjustment of the vertical position or height of the cam follower roller on the knife carriage to support such carriage at different heights above the pitch rail. In the preferred embodiment, the height adjustment of the cam follower roller is accomplished by means of an eccentric which is rotated by a lever arm connected to the piston rod of a pitch adjustment cylinder operated by a servo valve in response to the pitch control output signal of the computer. The cylinder contains a transducer which produces a piston rod position signal corresponding to such height which is fed back to the computer to provide a closed loop feedback control in order to accurately set the pitch angle within 0.01 degree as a function of the horizontal position of the main knife carriage along the pitch rail during peeling.

The present invention has the advantage that different pitch angle profiles for adjustment of the lathe knife pitch angle are easily defined and revised by changing the data entries stored in the computer memory. In addition, the computer enables quick selection of the appropriate pitch profile from a plurality of pitch profile tables stored in such memory. Also, the ability to develop more optimum pitch profiles for different wood species and different wood conditions is made possible. As a result, the quality of veneer is improved, and the production output of the veneer lathe is increased.

SUMMARY OF INVENTION

It is, therefore, one object of the present invention to provide an improved veneer lathe apparatus having an electrical control system for automatically adjusting lathe knife pitch angle during peeling as the radius of the log block diminishes.

Another object of the invention is to provide such an apparatus in which the lathe knife pitch angle is adjusted in a fast, accurate manner by a computer control system.

A further object of the invention is to provide an automatic lathe knife pitch adjustment apparatus in which a plurality of different pitch profiles defined by pitch data tables are stored in the memory of a digital computer so that such profiles may be selected in a rapid and precise manner by the computer for different wood species.

An additional object of the invention is to provide such an automatic knife pitch control apparatus in which the pitch profiles stored in the computer can be easily defined and revised by data entries in pitch data tables of knife pitch angles versus knife carriage positions.

Still another object of the invention is to provide such an apparatus in which the lathe knife pitch angle is quickly and easily changed during peeling by adjusting the height of the cam follower roller on the knife carriage in response to a computer output signal corresponding to the desired pitch angle.

A further object of the invention is to provide a closed loop computer control system for automatically adjusting a lathe knife pitch angle during peeling in a fast, accurate manner.

A still further object of the invention is to provide such a closed loop control system in which electrical signals are produced by a computer corresponding to a predetermined knife pitch angle and applied to a servo valve for controlling a cylinder to adjust the height of the cam follower on the knife carriage to the proper height for such pitch angle and a transducer produces a corresponding cylinder piston position signal which is fed back to the computer to verify when such height adjustment has been completed for the desired pitch angle.

DESCRIPTION OF DRAWINGS

Other objects and advantages of the present invention will be apparent from the following detailed description of a preferred embodiment thereof and from the attached drawings of which.

DESCRIPTION OF PREFERRED EMBODIMENT

Figure 1:
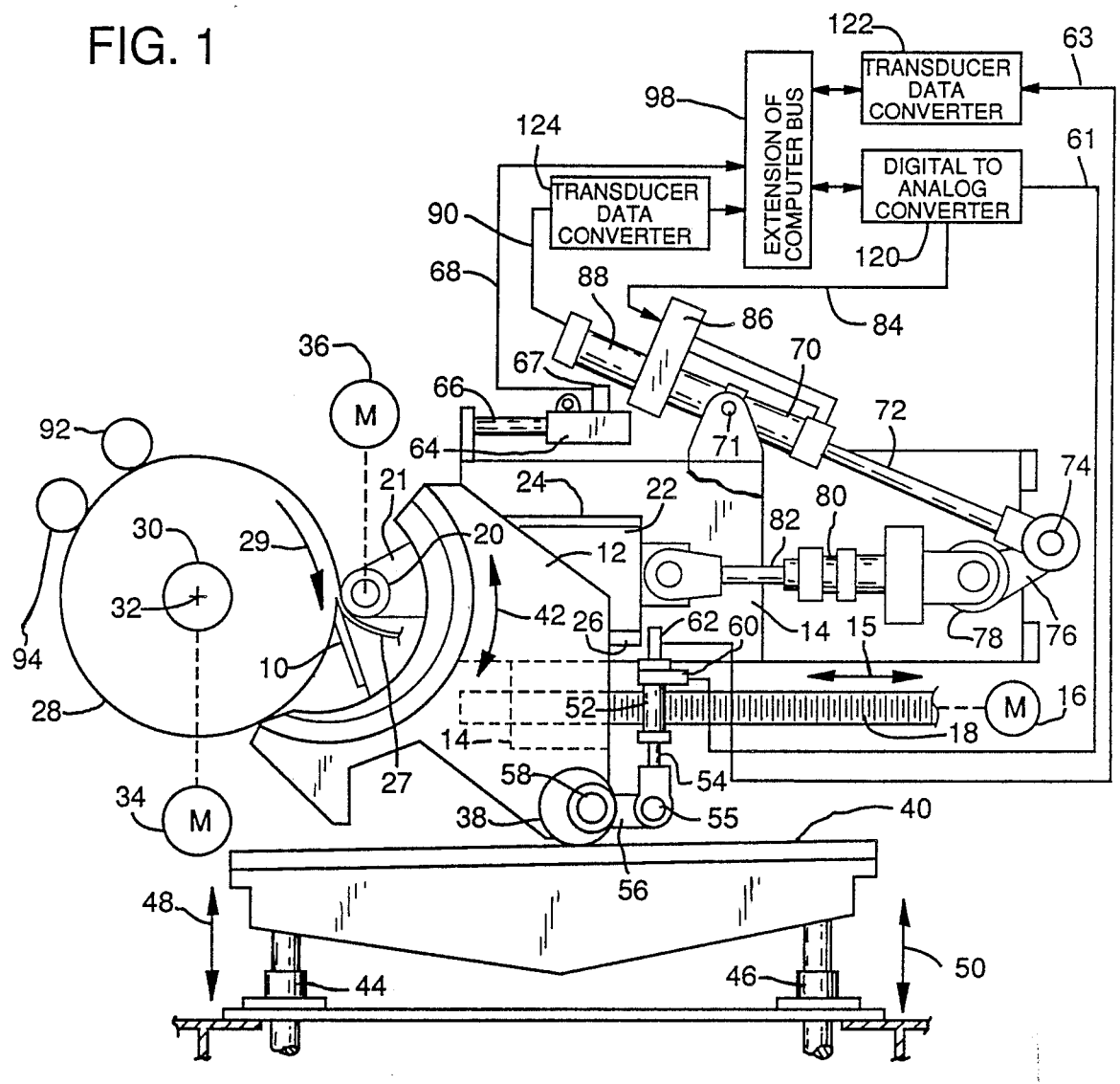
FIG. 1 is a partially diagramatic end view of a veneer lathe knife pitch angle adjustment apparatus in accordance with the invention.

As shown in FIG. 1, one embodiment of the veneer lathe apparatus of the present invention includes a lathe knife 10 supported for pivoting movement on a knife carriage 12, which is pivotally mounted on a main lathe carriage 14. The main carriage 14 is moved in a horizontal direction 15 by an electric motor 16 whose output shaft is geared to a pair of drive screws 18 at the opposite ends of the main carriage. The main carriage 14 also supports a nose bar roll 20 which is mounted by support arms 21 on a roll carriage 22 for adjustment of the knife gap between such roll and the knife by sliding movement within a pair of spaced guide channels 24 and 26 attached to the main carriage 14. The nose bar roll 20 is urged against the outer surface of a log block 28 to compress such surface at a position immediately in front of the knife blade 10 and is spaced from such knife by a gap corresponding to the thickness of the veneer to be peeled from such log block. As a result, the knife blade peels thin sheets of wood veneer 27 from the surface of the log block 28 as such log block is rotated in a clockwise direction 29 in FIG. 1.

The log block is driven in any suitable manner such as by a pair of powered spindles 30 which engage the opposite ends of the log at its central axis to rotate such log about an axis of rotation 32. The lathe spindles 30 are suitably coupled to a electric motor 34 for rotation in a conventional manner. The nose bar roll 20 may also be driven by connecting it to another electric motor 36 for rotating such nose bar roll and causing it to apply additional torque to the log for rotation thereof during peeling.

Figure 3:
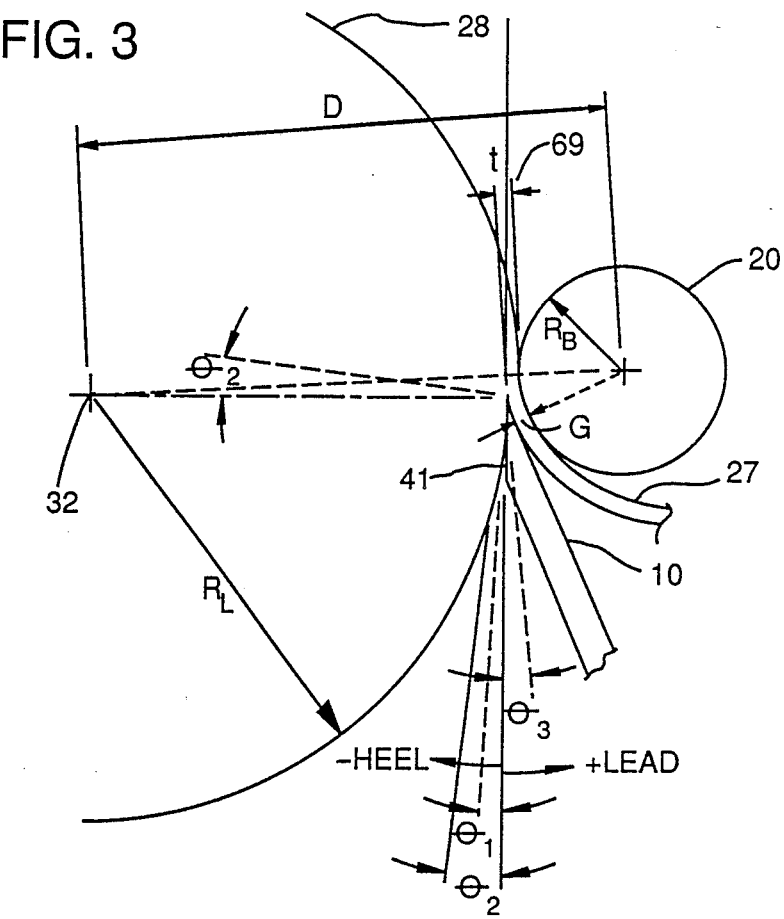
FIG. 3 is an enlarged view of a portion of the apparatus of FIG. 1 showing adjustment of the knife pitch.

During peeling, the knife blade 28 is moved horizontally toward the axis of rotation 32 of such block by movement of the main carriage 14 in the direction 15 with the motor 16 as the diameter of the block reduces. The knife carriage 12 is adjustably mounted on a cam follower roller 38, which rolls along a pitch rail cam member 40. The pitch rail 40 is provided with a predetermined slope so that as the cam follower roller 38 moves along such pitch rail, it causes the knife carriage 12 to pivot in the clockwise and counterclockwise directions of arrows 42 about the point of the knife blade 10. As a result of adjustment of the height of roller 38 on the knife carriage 12 and the slope of the rail 40, the pitch angle of the knife blade between the blade's front surface 41 and a vertical plane may be varied positively and negatively from an angle of zero degree where the front surface of the knife blade is vertical, as shown in FIG. 3. The range of variation of the knife pitch angle is between a positive pitch angle or "lead" of up to +1 degrees in a clockwise direction away from the log and a negative pitch angle or "heel" of about −5 degrees in a counterclockwise direction toward the log in FIG. 1 when the slope of the rail 40 is zero or parallel to the horizontal direction 15. Thus, the pitch angle of the knife blade is set by the slope of the pitch rail cam 40 and by the height of the cam follower roller 38 on the knife carriage 12. Rail 40 can be set to a background slope enabling total operating range of pitch adjust from +10 degrees to −10 degrees.

Normally, the pitch rail 40 has a constant slope, but it may be provided with an end portion of changing slope nearest the log which is greater than the slope of its other portion, as shown by element 120 in U.S. Pat. No. 4,708,180. However, different species of wood and different wood conditions of the same species require changes in the pitch profile for optimum yield of veneer of substantially uniform thickness and high quality. This pitch angle profile change for different species of wood is conventionally done manually by adjusting the slope of the pitch rail 40 before peeling through adjustment of a pair of threaded mounts 44 and 46 at the opposite ends of the pitch rail with wrenches or a manually controlled motor. Thus, the mounts are rotated to adjust the height of the pitch rail by raising or lowering the ends of such rail in the direction of arrows 48 and 50 in order to set the rail slope. This manual adjustment of the slope of the pitch rail is slow and inaccurate, resulting in lower quality veneer and reduced production. The electrical control system of the present invention overcomes this problem by allowing rapid selection between a plurality of predetermined pitch profiles stored in the computer memory as pitch data tables which can be easily changed by inputting new data with the computer terminal, as hereafter described.

The electrical control system for adjusting the knife pitch angle in accordance with the present invention includes a pitch adjustment cylinder 52 fixed at one end to the main carriage 14. The piston rod 54 of the pitch adjustment cylinder is pivotally connected at pivot 55 to one end of a lever arm 56 to rotate such lever arm. The lever arm 56 is connected at its other end to the shaft of an eccentric 58 which causes the center of the cam follower roller 38 to orbit about the axis of the eccentric to raise such cam follower roller to different heights on the knife carriage 12 in response to pivotal rotation of the lever arm of about 90 degrees or less by the pitch adjust cylinder 52. These adjustments of the height of the cam follower roller 38 on the knife carriage 12 cause such knife carriage to rotate the knife to different angles corresponding to such heights at any given position along the pitch rail 40. Thus, by adjusting the height of the cam follower roller 38 on the knife carriage 12, several different effective pitch profiles are provided for a given pitch rail 40 to change the pitch angle of the knife blade in accordance with different wood species and different wood conditions in a fast, accurate manner.

Figure 2A:
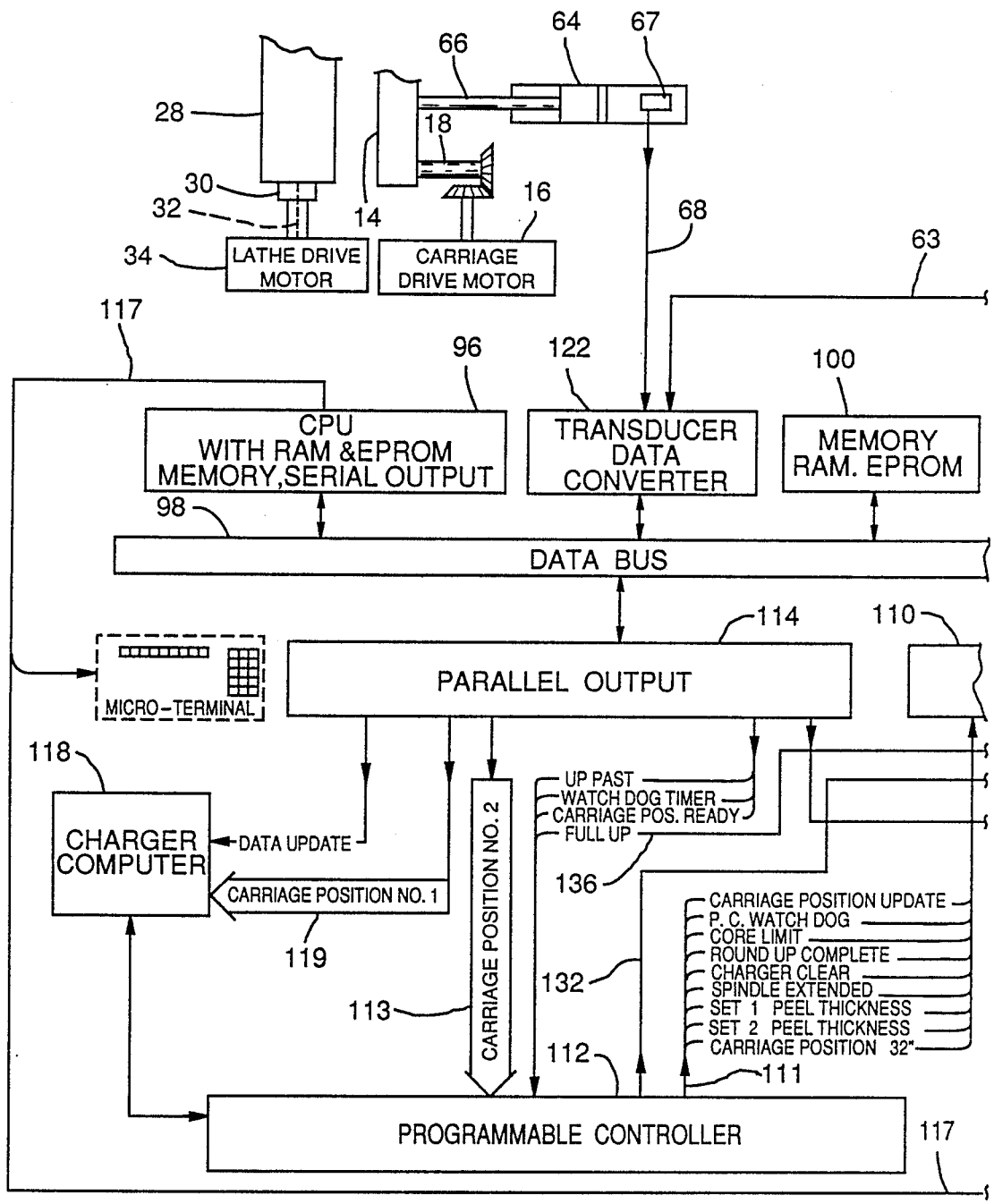
FIGS. 2A and 2B together constitute a schematic diagram of a computer control system which may be employed for the apparatus of FIG. 1.
Figure 2B:
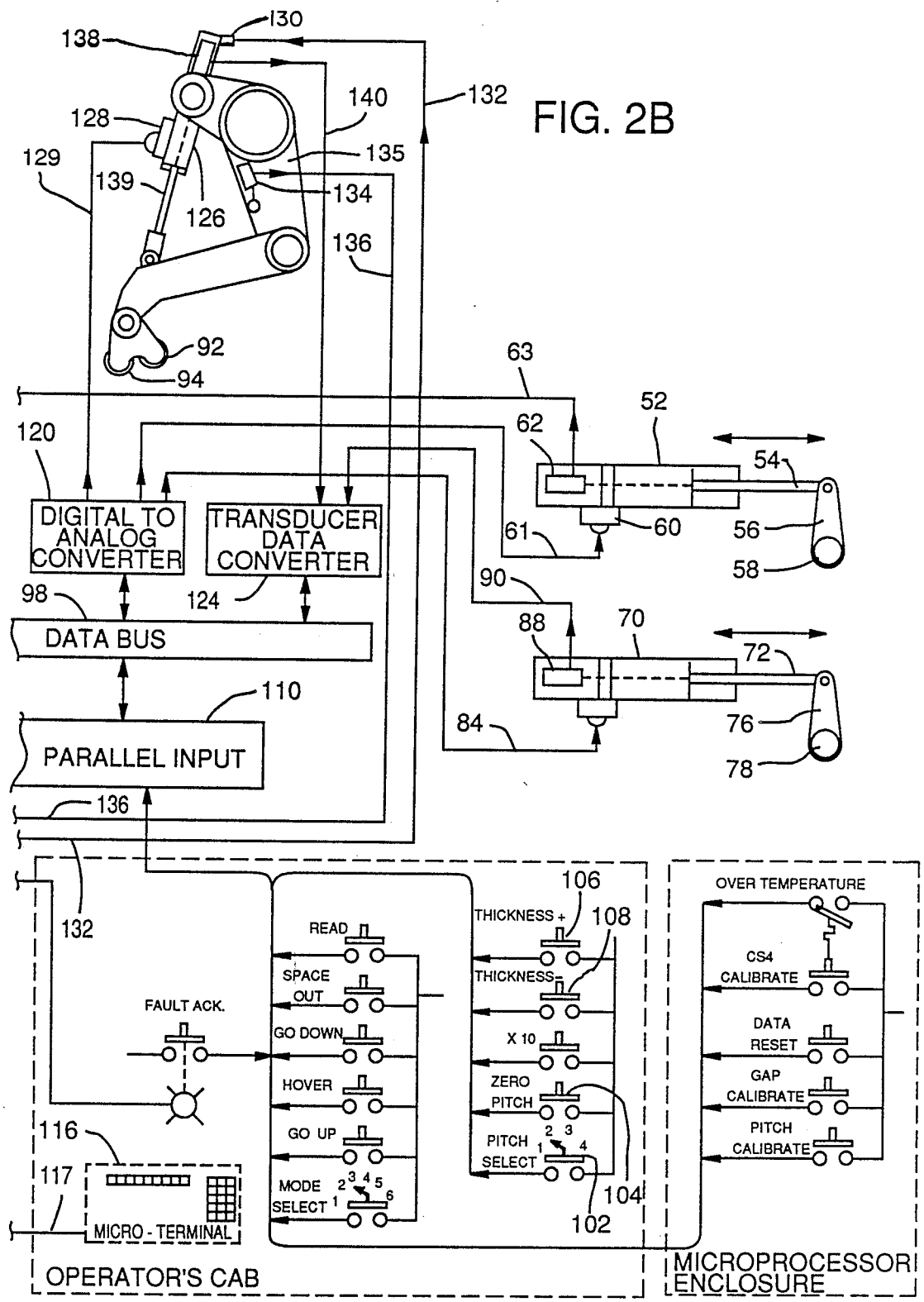

The pitch adjustment cylinder 52 is controlled by a servo valve 60, which is operated by the pitch control output signal at output terminal 61 of a digital computer in the computer control system of FIG. 2 as hereafter discussed. The position of the piston rod 54 in the pitch adjustment cylinder 52 corresponding to the height of the cam follower roller 38 is sensed by a transducer 62 to produce a height output signal which is applied to input terminal 63 of the computer control system. A main lathe carriage position cylinder 64, fixed to the frame of the lathe and whose movable piston rod 66 is connected to the main carriage 14 for movement with such carriage, causes a transducer 67 coupled to such piston rod to produce a lathe carriage position signal corresponding to the log block radius. This main carriage position signal is applied at an input 68 of the computer to indicate the log radius or the position of the knife blade 10 relative to the axis of rotation 32 of the log during peeling. The transducers 67 and 62 may be sonic pulse waveguide transducers of the Temposonics-type described in U.S. Pat. No. 4,708,180.

The horizontal knife gap 69 between the front surface 41 of the knife blade 10 and the nose bar roll 20 shown in FIG. 3 may also be automatically adjusted by the computer in response to changes in diameter of the log block 28 by means of a gap adjustment cylinder 70 mounted at pivot 71 on the main carriage 14. The piston rod 72 of such cylinder is pivotally connected at pivot 74 to a lever arm 76 which rotates an eccentric 78 that is pivotally attached to a second cylinder 80 to adjust the nose bar to knife gap. The second cylinder 80 has its piston rod 82 connected to the nose bar carriage 22 for reciprocating the nose bar roll 20 between the contact position shown in FIG. 1 with such roll in contact with the log during peeling and a retracted position in which the roll is removed from contact with the log to allow loading of new logs into the lathe. The gap between the nose bar roll 20 and the knife blade 10 is adjusted during peeling by means of the gap adjust cylinder 70 in response to gap control signals transmitted from a computer output 84 to a servo valve 86 controlling the cylinder 70. A gap spacing transducer 88 is attached to the gap adjustment cylinder 70 in order to sense the position of the poston rod 72 in such cylinder which corresponds to the gap spacing between the knife blade and the nose bar roll 20. The transducer 88 produces a gap spacing output signal which is applied to an input terminal 90 of the computer.

The operation of such nose bar roll gap adjustment in response to reduction in the diameter of the log block during peeling is described in greater detail in U.S. Pat. No. 4,708,180 of Browning, et al., issued Nov. 24, 1987.

It should be noted that a pair of backup rolls 92 and 94 may be provided which are moved into contact with the surface of the log block 28 on an opposite side thereof from the knife blade 10 and nose bar roll 20 when the log block has been peeled to a small diameter on the order of about 8 inches. Thus, the backup rolls 92 and 94 prevent the bending of log blocks of small diameter during peeling due to the pressure of the knife and nose bar. The movement of the backup rolls toward the center of rotation 32 of the log block may also be adjusted by the computer.

A computer control system for adjusting the lathe knife pitch angle in accordance with the present invention is shown in FIG. 2. Such computer control system includes a central processing unit (CPU) 96 of a general purpose digital computer which contains a digital data memory including a random access memory (RAM) and an electronic programmable read-only memory (EPROM) in which the computer program for operating such system is stored. The CPU 96 is connected to a data bus 98 including parallel lines having a plurality of inputs and outputs. A digital data storage memory 100, consisting of a RAM and an EPROM is employed to store the data of several knife pitch angle profiles for different species of wood, such profiles being stored in the form of pitch data tables such as that shown in FIG. 4. The pitch angle profile tables may be each formed by 14 pairs of data points corresponding to the various knife pitch angles at different log block radii or distances from the knife to the axis of rotation 32 of such block.

Four different pitch profiles may be stored in the computer memory 100 and selectively accessed by the computer control system by means of a pitch selection switch 102. The pitch selection switch has four different switch positions corresponding to such four pitch rail profile tables. In addition, a zero pitch angle control switch 104 is provided to calibrate the pitch adjust system to the front face bevel 41 ground into knife 10, as well as two veneer thickness adjustment settings 106 and 108. These switches all supply input signals through a parallel input circuit 110 and the data bus 98 to the computer. Peel thickness signals "set 1 peel thickness" and "set 2 peel thickness" corresponding to two different veneer thicknesses, such as 0.100 inch and 0.200 inch, are transmitted from output 111 of a programmable controller 112 through the parallel input 110 to the CPU 96. Such programmable controller also receives input information from the computer, such as the knife "carriage position No. 2" signal at input 113, through a parallel output circuit 114. The thickness adjustment switches 106 and 108 are for "fine tuning" adjustment of the knife gap between the knife blade and the nose bar roll for a selected veneer thickness in order to compensate for knife dullness and other variables. A computer terminal 116 is provided for manual input of data and for displaying output information gathered by the computer, such terminal being connected by lead 117 to the central processing unit 96.

A lathe charger computer 118 may also be provided for controlling the measurement and centering of logs in a lathe charger (not shown) and for transmitting such logs into the lathe with such lathe charger. Charger computer 118 does not control the knife pitch adjustment. However, such charger computer may be connected to the parallel output circuit 114 of the above-described computer, including CPU 96, to receive control signals including lathe "carriage position No. 1" signal at input 119 so that the veneer lathe charger does not transfer logs into the lathe until peeling of the previous log is finished and the main lathe carriage has been retracted far enough to allow clearance for loading next log.

As shown in FIG. 2, the pitch adjustment cylinder 52 has its servo control valve 60 connected to the output 61 of a digital-to-analog converter 120 of the computer control which converts the digital data received from the computer corresponding to a pitch rail profile table stored in memory 110 into an analog pitch adjustment signal. The pitch adjustment signal causes the pitch adjustment cylinder 52 to rotate the pitch adjustment eccentric 58 to change the height of the cam follower roller 38 on the knife carriage 12 to the proper value of the desired pitch angle for the log diameter corresponding to the position of such cam follower roller on the pitch rail 40. The transducer 62 of the pitch adjustment cylinder 52 transmits a height position signal corresponding to the position of the piston rod 54 to input 63 of a transducer data converter 122. From this transducer signal, the computer can determine when the selected height of the cam follower roller corresponding to the desired pitch angle is reached and then terminate the pitch adjustment signal applied to valve 60. Thus, a closed-loop feedback control system is provided.

It should be noted that the position of the main carriage 14 on the pitch rail 40 corresponding to the distance of the knife blade 10 from the axis of rotation 32 of the log or to the radius of such log is provided by an output signal of the position transducer 67 of the carriage position cylinder 64. The main carriage position signal is transmitted from the transducer 67 to input 68 of the transducer data converter 122. This main carriage position signal enables the CPU to determine the knife pitch angle from the selected pitch profile table stored in the computer 100 which has been selected by the pitch select switch 102.

The nose bar roll gap adjustment cylinder 70 is also provided with a servo valve 86 connected to the output 84 of the digital-to-analog converter 120 which is coupled through the data bus 98 to the CPU 96. As a result, the nose bar roll gap control cylinder 70 is caused to rotate lever arm 76 and the eccentric 78 to adjust the gap between the nose bar roll 20 and the knife blade 10 in accordance with the radius of the log block 28 being peeled which is determined from the output 68 of the main carriage transducer 67 that is applied to the transducer data converter 122, as discussed above. A gap spacing transducer 88 coupled to the piston rod 72 of the nose bar roll gap cylinder 70 produces a gap spacing signal which is applied to input 90 of the transducer data converter 124. The converter 124 applies the gap spacing signal through the data bus 98 to the CPU 96 which, when the desired gap spacing is reached, terminates the gap adjustment signal applied to valve 86. Thus, the nose bar roll gap is also adjusted by a closed-loop control system.

Backup rolls 92 and 94 are moved together into engagement with the log block 28 when such log block has been peeled to a small diameter of, for example, about 8 inches diameter by an actuation cylinder 126 controlled by a servo valve 128 connected to an output 129 of the digital-to-analog converter 120. Thus, the servo valve 128 controls the cylinder 126 in response to a computer output signal to move the backup rolls 92 and 94 into engagement with the log when it reaches a diameter of 8 inches. The cylinder 126 continues to move the backup rolls toward the axis of rotation 34 of such log during peeling until peeling stops. At this time, a control signal is generated by the controller 112 and applied to fast-up valve 130 connected to actuation cylinder 126 to quickly raise the backup rolls to the retracted or full-up position, thereby allowing a new log to be loaded into the veneer lathe. A full-up limit switch 134 is provided on a support arm 135 for the backup rolls to produce an output signal which is applied at an input 136 of the programmable controller to tell it that the backup rolls have reached the full-up position. A transducer 138 produces a backup roll position signal corresponding to the position of the piston rod 139 of actuation cylinder 126 and supplies such position signal at computer input 140 to the transducer data converter 124. This tells the computer the position of the backup rolls relative to the axis of rotation of the log so they are maintained in contact with the surface of the log at the proper pressure during peeling.

Figure 4:
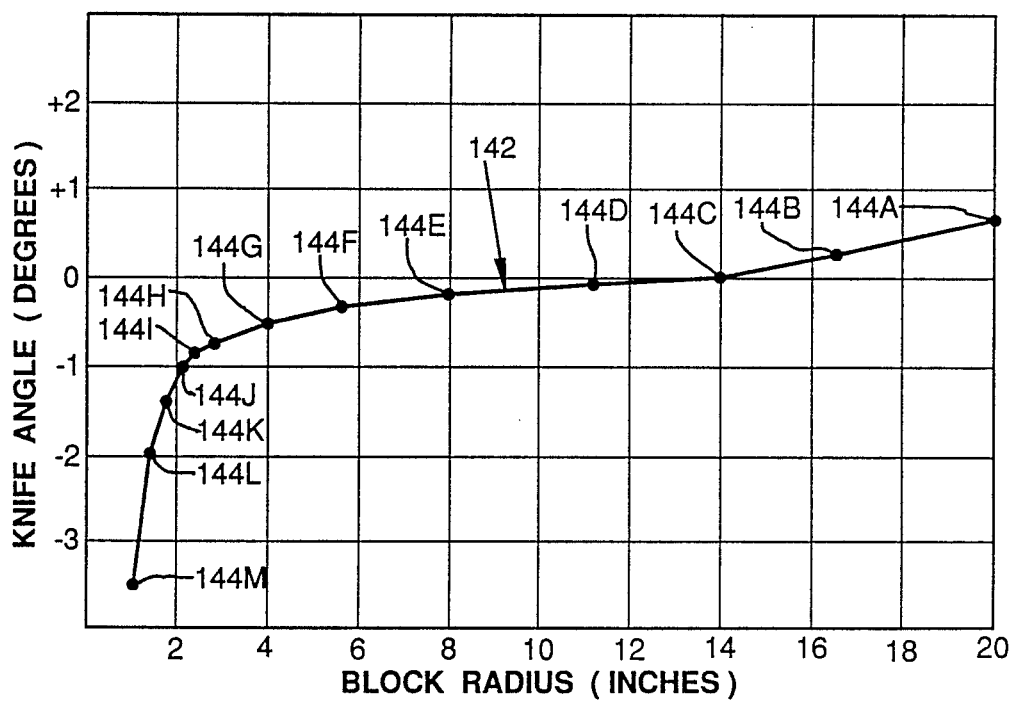
FIG. 4 is a diagramatic view of a typical lathe knife pitch angle profile stored as a pitch data table in the memory of the computer system of FIG. 2.

A knife pitch angle profile 142 which is exemplary of the type which may be stored in the computer memory 100 in the control system of FIG. 2 is shown in FIG. 4. Such profile, which is typical for Douglas fir or hemlock, is in the form of a curve of joined data points 144, each representing a knife pitch angle at a given log block radius. The pitch profile curve 142 consists of 13 data points, labeled 144A to 144M, corresponding to different knife pitch angles for different log block radius positions. Thus, point 144A has a positive pitch angle of about +0.6 degree at a block radius of 20 inches, point 144B has a pitch angle of +0.2 degree for a block radius of about 16.5 inches, while data point 144C has a pitch angle of zero degree at a block radius of 14 inches. Then the pitch angle decreases to negative angles of progressively greater magnitude as the block radius decreases. Thus, point 144D has a pitch angle of about −0.1 degree at about 11.2 inch radius, point 144E has a pitch angle of −0.2 degree at a radius of 8 inches and point 144F has a pitch angle of −0.35 degree at a radius of about 5.7 inches. The pitch angle decreases rapidly to an angle of −2.0 degrees at a radius of approximately 1.5 inches at point 144L which corresponds to a log block diameter of 3 inches. The pitch angle would be adjusted to an even lower pitch angle of −3.5 degrees at a block radius of 1 inch at point 144M, if peeling to this small diameter.

An important advantage of the present invention is that any of the data points 144 on the pitch angle profile curve 142 may be changed to provide a new pitch profile curve simply by changing the data in the pitch profile table stored in the computer 100. This can be done by manually inputting a new data point by means of terminal 116. Thus, the present invention is an extremely versatile and accurate way of changing the pitch angle profiles for different wood species and different log conditions such as moisture content or sap content.

It will be obvious to one having ordinary skill in the art that many changes may be made in the above-described preferred embodiment of the present invention. Therefore, the scope of the invention should be determined by the following claims.

I claim:

1. Veneer lathe apparatus with automatic adjustment of the knife pitch angle, comprising:
   drive means for rotating a log;
   main carriage means for moving the lathe knife toward said log to peel veneer from the log;
   knife carriage means for supporting the lathe knife and being pivotally mounted on said main carriage means to change the pitch angle of said knife;
   pitch rail cam means for guiding the movement of said knife carriage means along a mechanical pitch rail;
   cam follower means mounted on said knife carriage means for engagement with said pitch rail cam means to cause said knife carriage to pivot as said cam follower means moves along said pitch rail cam means to adjust the pitch angle of said knife through a range of pitch angles during peeling as the main carriage is moved toward the log; and
   control means for automatically adjusting the position of said cam follower means on said knife carriage means in response to changes in the position of said main carriage means to vary said range of pitch angles.

2. Apparatus in accordance with claim 1 in which the control means is an electrical control means.

3. Apparatus in accordance with claim 2 in which the electrical control means includes a digital computer control system having a memory means in which is stored a plurality of data tables of different pitch angle ranges for logs of different wood species.

4. Apparatus in accordance with claim 1 in which the cam follower is a cam roller which is adjusted in height on the knife carriage means by an eccentric means moved by said control means.

5. Apparatus in accordance with claim 4 in which the control means includes a cylinder means whose piston rod is connected to the eccentric means by a coupling link for pivoting said eccentric means.

6. Apparatus in accordance with claim 5 in which the control means also includes a digital computer means for causing said cylinder means to extend its piston rod by a predetermined amount corresponding to the current knife position to provide a pitch angle selected from a range of pitch angles determined from a table of data stored in a digital memory of said computer means.

7. Apparatus in accordance with claim 6 which also includes transducer means for producing a pitch signal corresponding to the position of said piston rod and indicating the pitch angle portion of the knife contributed by the piston rod position and for applying said pitch signal to said computer.

8. Apparatus in accordance with claim 1 which also includes a nose bar carriage means for slidably mounting a nose bar roll on said main carriage means, and second cylinder means for moving said nose bar carriage means toward and away from said lathe knife to vary the gap between said nose bar roll and said knife.

9. Apparatus in accordance with claim 1 in which the slope of the pitch rail cam means is fixed during peeling.

10. Electrical control system for automatic adjustment of veneer lathe knife pitch angle, comprising:
    pitch adjustment means for adjusting the pitch of a veneer lathe knife by moving an actuation (rod) element in response to a pitch adjustment input signal and including means for adjusting the height of a cam follower on a lathe knife carriage which pivotally supports the knife and the lathe carriage, when actuated by said movement of said actuation element;
    first transducer means for producing a pitch angle indication signal corresponding to the position of said rod;
    second transducer means for producing a lathe carriage position output signal corresponding to the position of a lathe carriage moving said knife toward a rotating log block to peel veneer from said block, said lathe carriage position being related to the radius of said log block; and
    computer means for producing said pitch adjustment signal in response to said lathe carriage position signal and for terminating said pitch adjustment signal in response to said pitch angle indication signal when the desired pitch angle is reached.

11. A system in accordance with claim 10 in which the computer means includes data memory means in which several different ranges of pitch angle data tables are stored, and selector means for selecting one of said pitch angle tables to be used by said computer means to produce said pitch adjustment signal.

12. A system in accordance with claim 11 in which the computer means includes a digital computer central processing unit connected to said data memory means.

13. A system in accordance with claim 12 in which the pitch adjustment signal is produced by a digital to analog converter having its input connected to said central processing unit and the pitch angle indicator signal and lathe carriage position signal are applied to an analog to digital converter whose output is connected to said central processing unit.

14. A system in accordance with claim 10 in which the pitch adjustment means is a cylinder which has its piston rod connected (to) as the actuation element to the means for adjusting the height of a cam follower roller on a knife carriage pivotally supporting the knife on the lathe carriage.

15. A system in accordance with claim 12 in which the computer means includes a computer terminal for inputting data into said pitch angle tables stored in said memory.

16. A veneer lathe apparatus with automatic adjustment of knife pitch angle, comprising:
    drive means for rotating a log;
    main carriage means for moving the lathe knife toward said log to peel veneer from said log;
    knife carriage means for supporting the lathe knife and being pivotally mounted on said main carriage to change the pitch angle of said knife;
    pitch rail cam means for guiding movement of said knife carriage means along a mechanical pitch rail;
    cam follower means mounted on said knife carriage means for engagement with said pitch rail cam means to cause said knife carriage to pivot as said cam follower means moves along said pitch rail cam means to adjust the pitch angle of said knife through a range of pitch angles during peeling as the main carriage is moved toward the log; and
    electrical control means for automatically adjusting the position of said cam follower means on said knife carriage means in response to changes in the position of said main carriage means to vary said range of pitch angles.

17. Apparatus in accordance with claim 16 in which the electrical control means includes a digital computer control system.

18. Apparatus in accordance with claim 17 in which said computer control system includes memory means for storing a plurality of data tables of different pitch angle ranges and selector means for selecting one of said data tables to control adjustment of said cam follower means.

19. Apparatus in accordance with claim 16 in which the control means includes first transducer means for producing a pitch angle indicator signal corresponding to the pitch angle of the lathe knife, second transducer means for producing a main lathe carriage position signal corresponding to the position of said main carriage and related to the radius of the log being peeled, and adjustment means for adjusting the position of said cam follower means in response to said main lathe carriage position signal and said pitch angle indicator signal.

20. Apparatus in accordance with claim 19 in which the adjustment means is an adjustment cylinder which is controlled by a digital computer control system.

* * * * *

UNITED STATES PATENT AND TRADEMARK OFFICE
CERTIFICATE OF CORRECTION

PATENT NO. : 4,979,120

DATED : December 18, 1990

INVENTOR(S) : Gary W. Ely

It is certified that error appears in the above-identified patent and that said Letters Patent is hereby corrected as shown below:

In the Abstract:

Line 8, "compute" should be --computer--.

Column 5, line 40, "poston" should be --piston--.

In the Claims:

Col. 9; Claim 10, line 4, delete "(rod)"; and

Col. 10; Claim 14, line 3, delete "(to)".

Signed and Sealed this

Second Day of March, 1993

Attest:

STEPHEN G. KUNIN

Attesting Officer

Acting Commissioner of Patents and Trademarks